United States Patent [19]

Ramus et al.

[11] Patent Number: 4,666,677
[45] Date of Patent: May 19, 1987

[54] POLLUTION CONTROL DEVICE

[75] Inventors: Gary D. Ramus, Huntley; Christopher R. Ahnen, Algonquin, both of Ill.

[73] Assignee: Continental Thermal Design, Inc, East Dundee, Ill.

[21] Appl. No.: 791,058

[22] Filed: Oct. 24, 1985

[51] Int. Cl.$^4$ ................................. F01N 3/10
[52] U.S. Cl. ........................ 422/183; 431/5; 431/268
[58] Field of Search ............... 422/170, 176, 177, 182, 422/183, 195, 188–193; 60/299, 303; 110/210–212, 214; 431/5, 268; 55/267, 318, 270, 418; 101/425

[56] References Cited

U.S. PATENT DOCUMENTS

| | | | |
|---|---|---|---|
| Re. 25,626 | 7/1964 | Yeo et al. | 432/222 |
| 2,898,201 | 8/1959 | Hayes | 422/182 X |
| 3,056,467 | 10/1962 | Ravich | 422/176 X |
| 3,251,656 | 5/1966 | Edwards | 422/176 |
| 3,297,259 | 1/1967 | Maxon, Jr. et al. | 239/397.5 |
| 3,560,165 | 2/1971 | Beasley | 422/176 X |
| 3,732,075 | 5/1973 | Acaba | 422/176 X |
| 3,898,040 | 8/1975 | Tabak | 431/5 X |
| 3,902,854 | 9/1975 | Brown | 60/303 X |
| 3,960,504 | 6/1976 | Griffin | 422/182 |
| 4,015,927 | 4/1977 | Culpepper, Jr. | 422/182 X |
| 4,018,568 | 4/1977 | Brewer | 55/160 X |
| 4,054,418 | 10/1977 | Miller et al. | 60/297 X |
| 4,213,947 | 7/1980 | Fremont et al. | 422/177 X |
| 4,322,386 | 3/1982 | Masutomi et al. | 422/171 |
| 4,348,362 | 9/1982 | Foss | 422/171 |
| 4,351,249 | 9/1982 | Inovius | 110/210 |
| 4,451,435 | 5/1984 | Hölter et al. | 422/171 |
| 4,476,852 | 10/1984 | Lee et al. | 110/203 X |
| 4,502,395 | 3/1985 | Barnett | 110/214 |

Primary Examiner—Richard L. Chiesa
Attorney, Agent, or Firm—Mathew R. P. Perrone, Jr.

[57] ABSTRACT

An apparatus for converting harmful hydrocarbon emissions into harmless gases includes, in sequence, a transition chamber, transition duct work, a burner chamber, a catalyst chamber, and a cap. The hydrocarbons are burned and then treated with a catalyst to substantially reduce or completely eliminate the visible hydrocarbon emissions, the odor and the total amount of hydrocarbon emission by more than ninety (90%) percent.

18 Claims, 9 Drawing Figures

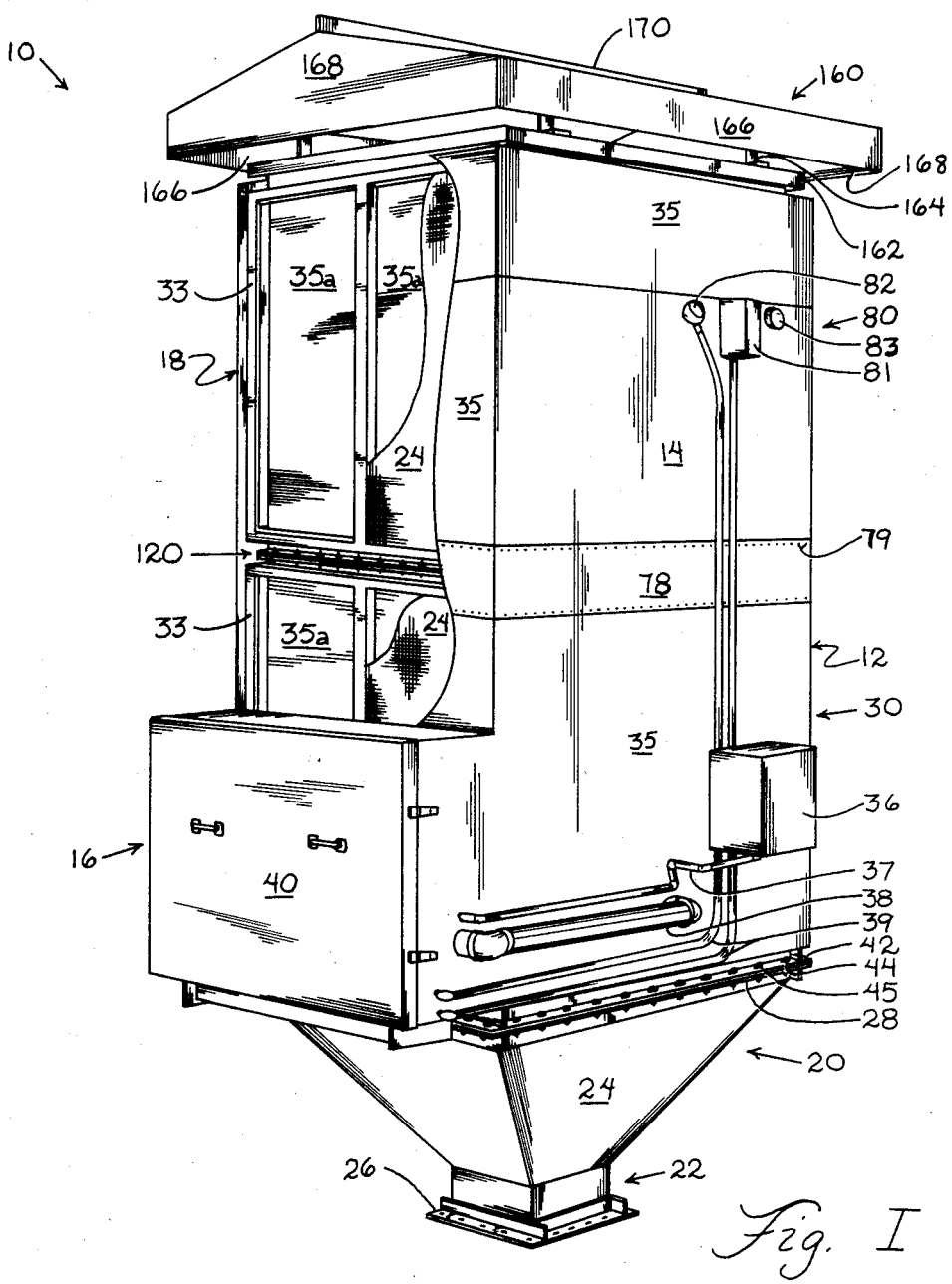
Fig. I
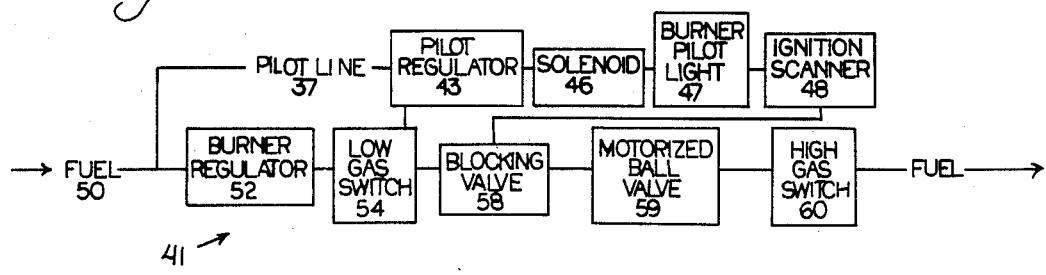
Fig. II

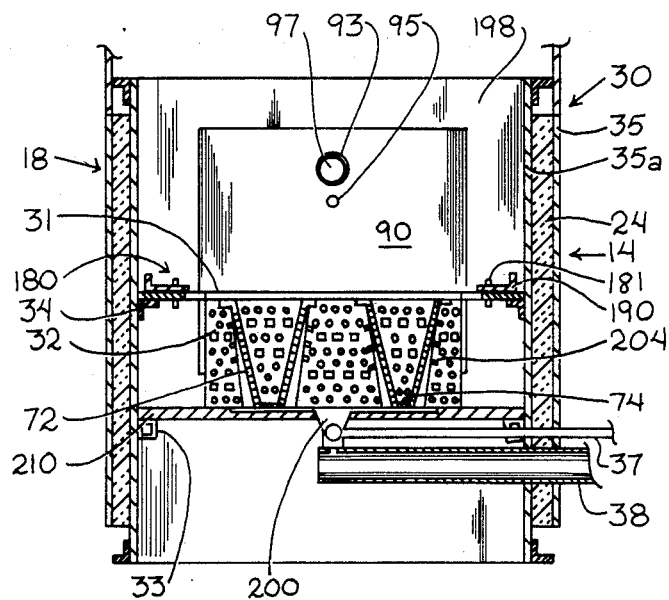
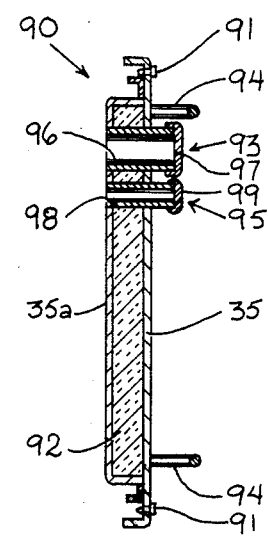
Fig. III
Fig. IV
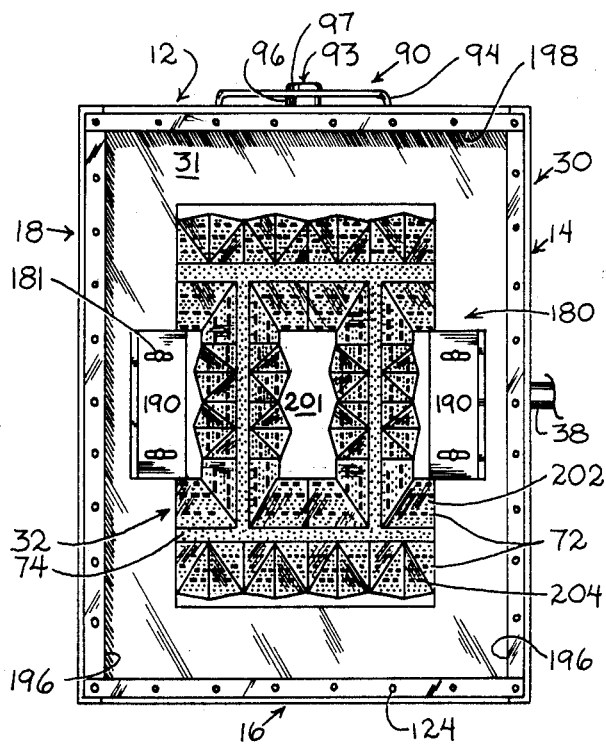
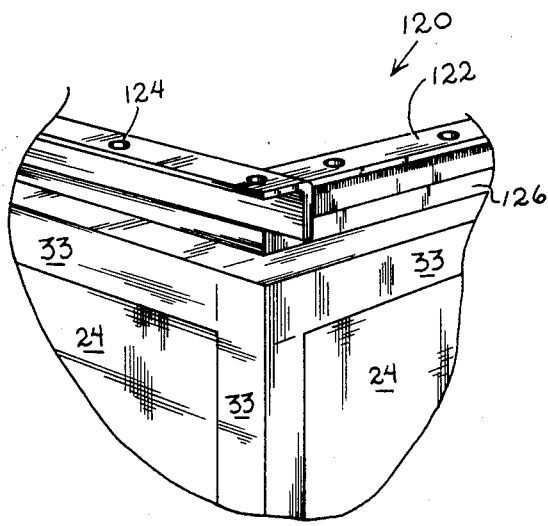
Fig. V
Fig. VI

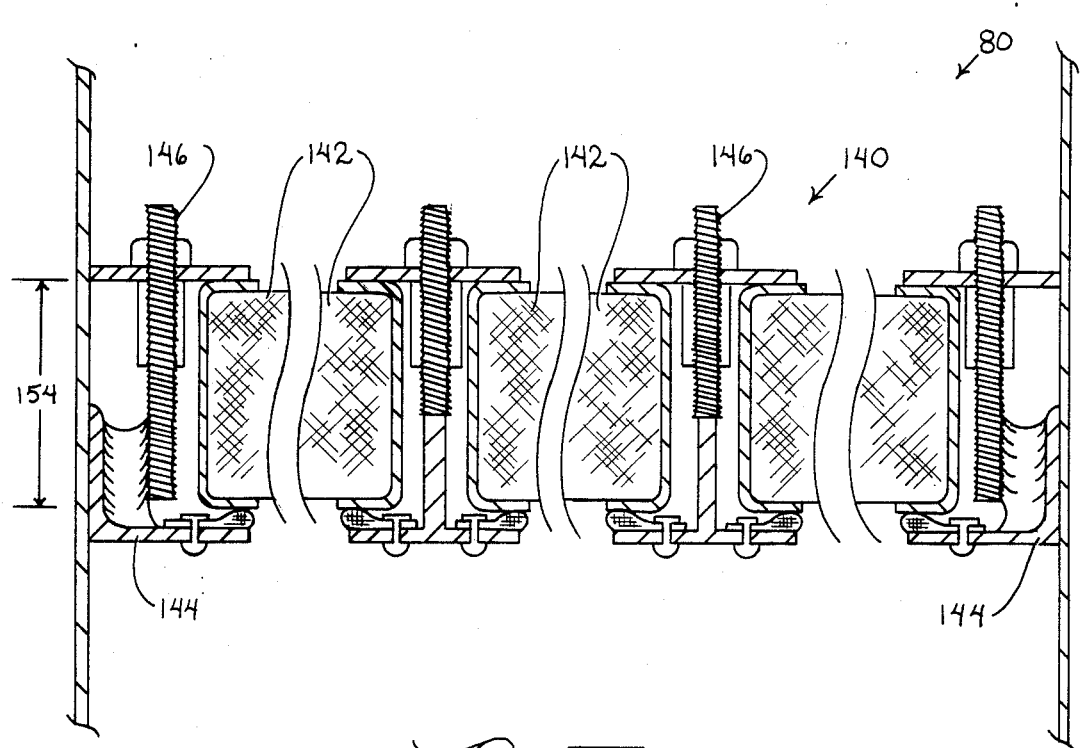
Fig. VII
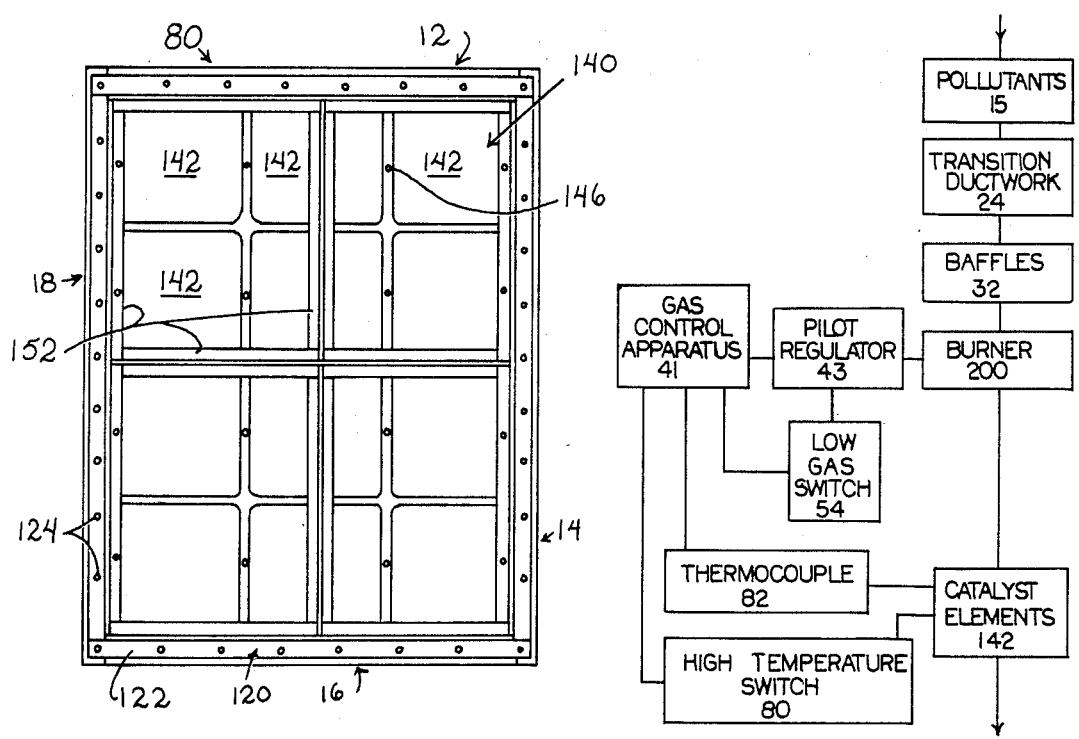
Fig. VIII
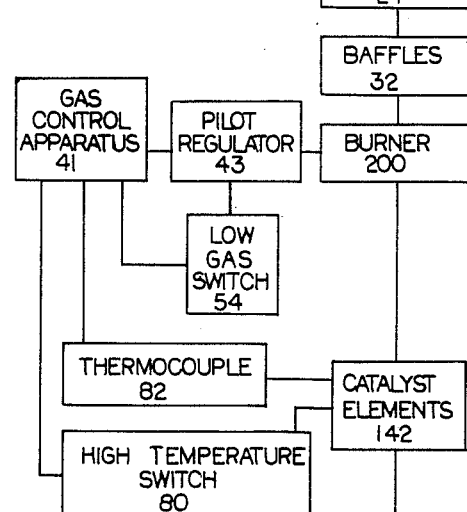
Fig. IX

POLLUTION CONTROL DEVICE

BACKGROUND OF THE INVENTION

This invention relates to a pollution control device and method; and more particularly to a device and method, which render the pollution caused by hydrocarbons harmless by using a combination of burning a hydrocarbon-containing exhaust under appropriate turbulent conditions and catalytically treating the burned hydrocarbons.

As a result of modern society and its manufacturing processes, an number of pollutants are produced, which pollutants can have an adverse effect on the environment. Yet, these processes are a necessary part of modern society. On the other hand, these same processes may cause pollution. It is always desirable to balance the advantages to society against the pollution caused by various industrial processes.

Certain industrial processes can produce noxious, odorous materials in gaseous form. These materials act as poisons, which are damaging to the environment and to the people close to the place where the processes are being practiced. This environmental damage is under increasing scrutiny from the Federal and State Environmental Protection Agencies. The basic problem is to maintain the advantages of these systems which produce the harmful materials, while materials.

Noxious gases and vapors produced by these products must be changed to harmless substances. A variety of processes are available to handle this problem of converting the harmful pollutants to the harmless compositions. Most of these devices for carrying out these conversion processes tend to be costly. Those devices which are not costly tend to be ineffective. The costliness is a result of the expense of putting together the system to remove the noxious substance and of the expense of maintaining the system.

Furthermore, it is highly critical that, whatever device or method is used to remove these noxious substances from the air, the device or method must be efficient, and not damage or substantially interfere with the manufacturing process. For example, if the device is too heavy to be simply supported by the manufacturing system, a tremendous amount of restructuring and costly supports are required.

These problems are especially difficult with regard to printing processes. These printing processes are useful. However, high speed printing processes common today use hydrocarbon oils or liquids as carriers for the pigment of the printing ink. These hydrocarbon oils permit very high speed printing processes, but give off pollution-causing, harmful vapors or gases. These harmful gases are in the form of hydrocarbon emissions from the heat set, web, offset inks and other processes. Of course, such materials are of great concern to those interested in preventing or minimizing pollution.

It is possible to burn the hydrocarbon oil vapors. However, the temperature required is in excess of 900° Centrigrade (1,500° Fahrenheit). The expense of such a system is too high in terms of fuel alone. The difficulty of constructing a system capable of handling such high temperatures adds to the complicated aspects of maintaining manufacturing efficiency, while minimizing pollution. Thus, burning along is an impractical method of pollution control.

California has especially stringent pollution controls. No nuisance odors are permitted. Generally, California requires ninety (90%) percent removal of hydrocarbons, zero (0) opacity and odor removal. These restrictions are very tough to meet.

Catalytic conversion of pollutants is also an impractical method of controlling pollution. Catalysts are usually made of noble metals and are, therefore, expensive. The catalysts also must be replaced on a regular basis. Thus, catalysts alone are an impractical method of pollution control.

Attempts to combine catalytic treatment with burning have proven difficult. If the burner assembly is highly efficient and runs at a temperature high enough to burn most of the pollutants, the flame contacts the expensive catalyst and shortens the useful life thereof. If the burner temperature is too low, the catalyst must receive too much of the pollution material and have a shorter life.

Success in removing hydrocarbons from exhausts of processes is measured in certain ways. One such way is determined from the opacity of the treated exhaust. The more opaque the exhaust from the pollution control system is, the less efficient the system is. Thus, if visible emissions are reduced, a substantial advantage is obtained.

It is also desirable to remove at least eighty five (85%) percent of the hydrocarbons from a pollution exhaust containing the same. It is also desirable to reduce odor in the system. The factors make pollution control in these fields very difficult.

It is, therefore, clearly desirable to develop an apparatus and a method for reducing and minimizing the environmental impact of these harmful materials which in a cost efficient manner with minimal interference with the manufacturing process.

SUMMARY OF THE INVENTION

Therefore, it is an objective of this invention to provide a method for converting harmful gases to harmless gases.

A further objective of this invention is to provide an apparatus for rendering harmful substances harmless.

A still further objective of the invention is to provide a method for rendering hydrocarbon emissions from heat set, web, offset inks harmless.

Yet a further objective of the invention is to provide an apparatus for rendering hydrocarbon emissions from heat set, web, offset inks harmless.

Also an objective of this invention is to provide an apparatus for pollution control which is easily installed.

Another objective of this invention is to provide an apparatus for pollution control which minimizes interference with the manufacturing process.

Still another objective of this invention is to provide an apparatus for pollution control which avoids total dependance on burning.

Yet another objective of this invention is to provide an apparatus which reduces the opacity of hydrocarbon exhaust.

A further objective of this invention is to provide an apparatus for reducing the odor of hydrocarbon exhausts.

A still further objective of this invention is to provide a method for pollution control which avoids total dependance on burning.

Yet a further objective of the invention is to provide an apparatus which combines efficient burning of pollutants with catalytic treatment.

These and other objectives of the invention (which other objectives become clear by consideration of the specification, claims and drawings as whole) are met by a method and apparatus for converting harmful hydrocarbon emissions wherein the apparatus includes a transition chamber, transition duct work, a burner chamber, a catalyst chamber, and a cap. The hydrocarbons are burned and then treated with a catalyst to substantially reduce or completely eliminate the visible hydrocarbon emissions, the odor from the process and the total amount of hyrdocarbon emission by more than ninety (90%) percent.

BRIEF DESCRIPTION OF THE DRAWINGS

FIG. I is a partial, cut-away, perspective view of the pollution control unit 10 of this invention.

FIG. II is a block diagram of the gas control apparatus 41.

FIG. III is a section view depicting the burner chamber 30.

FIG. IV is a side, cross-sectional view of the burner chamber door 90.

FIG. V is a top view of the baffles 32 in burner chamber 30.

FIG. VI is a partial, view of mounting assembly 120.

FIG. VII is a cross-section, side view of catalyst support 140.

FIG. VIII is a bottom view of catalyst support 140.

FIG. IX is a block diagram of pollution control unit 10.

Throughout the figures of the drawing where the same part appears in more than one figure of the drawing, the same number is applied thereto.

DESCRIPTION OF THE PREFERRED EMBODIMENTS

Hydrocarbon vapors are converted to harmless ingredients by using the pollution control device of this invention. The pollution control device basically includes a transition duct work to be connected to the exhaust of a hydrocarbon emitting process. The duct work feeds the hydrocarbon vapors into a burner, which is fueled by natural gas. The burner destroys some hydrocarbons by converting them into water and carbon dioxide. The remaining hydrocarbons are preheated and allowed to flow upwardly in the chamber to a catalytic convertor which converts the harmful ingredients to harmless ones at great efficiency.

Referring now to FIG. I, FIG. III and FIG. V, pollution control device 10 has door side 12, a gas line side 14, a control side 16 and a plain side 18. Door side 12 is perpendicular to gas line side 14, and plain side 18. Door side 12 is oppositely disposed from an substantialy parallel to control side 16.

Referring now to FIG. I, pollution control unit 10 is depicted as having transition duct work 20, burner chamber 30, catalyst chamber 80, and cap 160 in sequence. Burner chamber 30 is between duct work 20 and catalyst chamber 80. Cap 160 tops off the pollution control unit 10, and is secured to catalyst chamber 80 while being oppositely disposed from burner chamber 30.

Transition duct work 20 includes a chimney support 22 for the purpose of being secured to a chimney or other outlet of a hydrocarbon process. From chimney support 22, transition duct work 20 expands into pyramidal connector 24 so that the smallest portion of the pyramidal connector 24 is adjacent chimney support 22 while the largest portion of the pyramidal connector 24 expands to substantially match the cross section of burner chamber 30. Chimney flange 26 which is situated on chimney support 22 permits the pollution control unit 10 to be secured to a chimney or other item from which pollution control is desired.

Pyramidal connector 24 terminates in a pyramidal flange 28 which serves to connect transition duct work 20 to burner chamber 30. Burner chamber 30 has secured thereon a gas control casing 40 which holds the gas control apparatus 41 that directs the flow of gas into the burner 200. The chamber flange 42 mates with the pyramidal flange 28 to secure the burner chamber 30 to the transition duct work 20. Pyramidal flange 28 and chamber flange 42 both have flange apertures 44 which receive nut and bolt assembly 45 to thereby secure burner chamber 30 to transition duct work 20.

Burner band 78 covers the mounting assembly 120, which connects burner chamber 30 to catalyst chamber 80. Thus, burner band 78 protects the mounting assembly 120 and the interior workings of the pollution control unit 10. Burner band 78 may be riveted in place by rivets 79 or otherwise secured on device 10. Catalyst chamber 80 is clearly connected to burner chamber 30 and oppositely disposed from transition duct work 20.

The partial cut-away view of catalyst chamber 80 and burner chamber 30 in FIG. I shows insulation 24, the insulation 24 being sandwiched between members of frame 33, and exterior sheet metal 35 and interior sheet metal 35a. Members of frame 33 with exterior sheet metal 35 and interior sheet metal 35a form the sides of the pollution control device 10, with insulation 24 therebetween. Insulation 24 serves the standard purposes of reducing heat loss and helping to keep the temperature at a constant level.

Members of frame 33 are welded or otherwise secured together to form a skeleton for receiving sheet metal 35. Sheet metal 35 is welded or otherwise secured to frame 33. Members of frame 33 are also used to form flanges and mounts for items such as burner door 90, enclosure 36 and control box 40. Such flanges and mounts are designed to secure burner chamber 30 to catalyst chamber 80, and make similar joinders. Members of frame 33 additionally form the skeleton for burner chamber 30 and catalyst chamber 80—as well as other members of frame 33 as desired.

On burner chamber 30 is an enclosure 36. This enclosure 36 contains standard instrumentation for monitoring ignition and flame of the pilot light (not shown). Such monitoring provides a great safety feature for the device 10 and permits compliance with local fire codes. Enclosure 36 receives natural gas for the pilot light of burner 200 and contains a standard ultraviolet sensor (not shown) or similar device to monitor the pilot light and to stop the gas flow if the pilot light is not working.

The natural gas flow to provide fuel 50 to the burner 200 is controlled as it flows through pilot line 37 and main gas line 38, by instruments in the gas control case 40. Gas control case 40 contains the gas control apparatus 41, which feeds the gas into the main gas line and then into the burner chamber 30. The gas control apparatus 41 is a standard assembly for the purpose. Careful control of the gas flow is required. It is critical that the flame from burner 200 not contact the catalyst element 142. Accordingly, it is desired that the pressure of the gas going to the burner 200 be up to about 45 centimeters above that of the interior chamber. It is more desirable that the pressure of the gas going to the burner 200 be about 5 to about 35 centimeters above that of the interior chamber. It is most desirable that the pressure of the gas going to the burner 200 be about 15 to about 25 centimeters above that of the interior chamber.

Both the pilot line 37 and the gas line 38 are formed of pipes, as are wiring pipes 39. Wiring pipes 39 (shown as two pipes in FIG. I) receive various wires to connect the high temperature switch 81, the thermocouple 82, enclosure 36, and then to gas control casing 40. Wiring pipes 39 may also contain a compressed air hose (not shown) to assist the pilot light. Such use of compressed air provides for more efficient functioning of the pilot light, and burning of the natural gas and the pollutants.

Thermometer 83 is also adjacent high temperature switch 81 and thermocouple 82 to measure temperature of gases reaching the catalyst 140. Thus, thermometer 83, high temperature switch 81 and thermocouple 82 are operatively secured on the outside of catalyst chamber 80. The measurements of temperature provide information, through which the gas flow and temperature are adjusted for efficient operation of the device 10.

Cap 160 is on the top of pollution control unit 10. Cap 160 is secured to top mounting assembly 162 by cap brackets 164. Cap brackets 164 are welded or otherwise secureed to cap 160. A cap nut and bolt arrangment (not shown) secures the bracket cap 164 to top mounting assembly 162. Top mounting assembly 162 is substantially similar to mounting assembly 120. Cap brackets 164 are secured by welding or other standard methods to flat sides 166 of cap 160.

Flat sides 166 are paired and oppositely disposed, so that one of flat sides 166 is partially visible in the drawings, but is similar to the one shown. Triangle sides 168 provide the other supports for cap 160 and permit peaked roof 170 to be formed thereon. One of triangle sides 168 is only partially shown in the drawing, but is paired and oppositely disposed, so that the other one is similar to the one of triangle sides 168 shown in FIG. I.

In this fashion, cap 160 prevents the entry of rain and other undesirable material into the pollution control device 10 and the printing process.

Within gas control case 40, elements of the gas control apparatus 41 are contained and interconnected in a standard fashion to achieve operability. FIG. II in block diagram form depicts the workings of gas control apparatus 41. Fuel line 50 feeds to burner regulator 52 and pilot regulator 43, which in turn activates the low gas switch 54. Low gas switch 54 feeds a blocking valve 58 which in turns feeds a motorized ball valve 59. Motorized ball valve 59 feeds the high gas switch 60 and permits fuel 50 to flow into the burner 200. The pilot line 37 feeds gas to pilot regulator 43 and solenoid 46, which in turn adjusts the flow of gas to the burner pilot light 47. The ignition scanner 48 monitors the absence or presence of flame and activates electrical controls to open or close blocking valve 58.

These implements cooperate with implements in enclosure 36 by standard wiring techniques to adjust the flow of the gas and keep the burner gas temperature within the desired 250° C. to 350° C. (degrees Centrigrade or 550° F. to 650° F. (degrees Fahrenheit) range). If the temperature of the vapors reaching the catalyst is in excess of 350° C., the thermocouple 82 sends a signal to gas control apparatus 41 to reduce the temperature at burner 200. If the temperature of the vapors reaching the catalyst is below 350° C., the thermocouple 82 sends a signal to gas control apparatus 41 to increase the temperature at burner 200. Temperatures in this range provide for efficient burning, such that when used in combination with the ribbon catalyst convertor having a noble metal coating thereon, provides very efficient use of fuel and conversion of the harmful hydrocarbons into harmless material.

Referring now to FIG. III, the burner chamber 30 is shown in partial cross section. Insulation 24 is clearly viewable between the walls. The structure of the burner 200 becomes clear when considering this aspect of it. Burner 200 is supported on burner frame 210. Burner frame 210 can be made of I-beams or any other suitable mounting capable of supporting burner 200. Burner frame 210 is welded or otherwise secured to device frame 33. A member or members of device frame 33 are positioned so that the burner frame 210 may be secured thereto.

The baffles 32 are supported on burner frame 210 at the base thereof and profile plate 31 at the top portion thereof. The top portion support includes a profile plate flange 34 which serves to mount the profile plate 31 in the burner chamber 30. Baffles 32 include plurality of baffle sections. There is a baffle base 74 of basically rectangular shape with baffle sides 72 protruding upwardly therefrom at an angle of about 120°.

Referring now to FIG. III and FIG. V, the baffle sides 72 and the baffle base 74 are connected together to provide for a substantial amount of dwell time and tubulence in the burner chamber 30. By adjusting the baffle wings 190 in the appropriate fashion and maximizing the time, turbulence and temperature of the hydrocarbons in the burner 200 area, efficient burning of the hydrocarbon takes place before the catalyst is reached. In this fashion, the catalyst has a substantially longer life than most other catalytic systems.

Thermocouple 82, which is mounted on the outside of catalyst chamber 80, reads the temperature of the gas coming from the burner 200. In this fashion, the gas flow to the burner 200 can be adjusted upwardly or downwardly as required in order to achieve the most efficient burning and catalyst use.

Referring now to FIG. III, FIG. IV, and FIG. V, burner chamber 30 has a burner door 90 on the door side 12 of device 10. Thru burner door 90 easy access can be had for a visual inspection of the burner chamber 30, through large viewing port 93 and small viewing port 95. Burner door 90 is oppositely disposed on burner chamber 30 with respect to the gas control casing 40. Burner door 90 is bolted in a sealed relationship with the burner chamber 30 by door nut and bolt arrangement 91. Door insulation 92 prevents heat loss thru the burner door 90.

Large viewing port 93 includes a pipe 96 welded or otherwise secured through burner door 90. Pipe 96 is capped by large cap 97 in threaded relation or otherwise secured thereto on the exterior of burner door 90 and device 10. Small viewing port 95 has a structure similar to that of large viewing port, but is of smaller diameter. Small viewing port 95 includes a tube 98 capped by a plug 99 in threaded relation therewith. Either port is usable as desired by a person desiring to inspect the burner 200 by removing plug 99 or large cap 97. Sampling devices may also be be inserted therethrough to draw samples of gas for testing or to carry out other procedures.

In FIG. IV wherein burner door 90 is shown in cross-section, the structure of the burner door 90 can be seen. Door insulation 92 is sandwiched between door panels to prevent heat loss. Nut and bolt arrangement 91 holds the burner door 90 in place, while door handles 94 positions the burner door 90 in closed position.

Referring now to FIG. V, baffle mountings 180 for the baffles 32 are clearly shown. The structure of the baffle mountings 180 (which cooperate with profile plate 31 and profile plate flanges 34) permits the baffles 32 to be secured in the burner chamber 30 and permit sufficient mixing and useful combustion. Baffles 32 and baffle mountings 180 are secured within burner chamber 30. Baffle mountings 180 are formed by using, in combination, profile plate 31, baffle flanges 64, baffle sides 72, baffle base 74, and baffle wings 190. Baffle wings 190 are secured to profile plate 31 on the interior of burning chamber 30 at opposite and bracket walls 196 thereof. Bracket walls 196 are substantially perpendicular to door wall 198. Door wall 198 includes burner door 90.

Baffles 32 are secured to profile plate 31 at baffle wings 190 and also included in baffle mountings 180. Profile plate 31 is welded to profile plate flange 34 or otherwise secured in burner chamber 30 to direct the vapor flow through burner 200 and baffles 32. Profile plate 33 is between burner 200 and catalyst 140. Baffle base 74 joins each baffle side 72 and has burner outlet 201 centrally located therein.

Baffle wings 190 are secured to profile plate 31 at an obtuse angle of greater than ninety (90°) degrees to baffle sides 74 and serve to create turbulence in mixing of air and polluting gases to provide for more efficient burning of the pollutants. Baffle wings 190 are adjustable so that the static pressure of the gas before and after burner 200 might be correspondingly changed. Baffle wings 190 are bolted to profile plate 37 at wing slots 181. Wing slots 181 serve to position baffle wings 190 in burner chamber 30 to thereby adjust the static pressure as desired.

The static pressure is determined by a slack tube manometer, using a water column. The burner 200 is selected to achieve temperature most efficiently with the low static pressure. Generally, static pressure is the measure of pressure difference below and above the burner. That static pressure is desired to be in the range of one to five centimeters. More preferably, the static pressure is desired to be one to four centimeters. Most preferably, the static pressure in desired to be two to three centimeters. Thus an efficient, relatively low burning temperature can be used to achieve the desired combustion of the pollutants. This burning combined with the catalyst element 142 permits a synergistic effect unobtainable by catalyst or burning alone with such great efficiency.

Baffles 32 additionally include baffle apertures 202 and baffle side flanges 204 in baffle sides 72. Baffle apertures 202 and baffle side flanges 204 provide turbulence to permit more efficient burning. The burner 200 in combination with baffles 32 is available from Maxon Corporation of Muncie, Ind.; and described in U.S. Pat. No. 3,297,259 to Maxon, Jr.; and U.S. Pat. No. Re. 25,626 to Yeo et al.—both of said patents being incorporated herein by reference.

Referring now to FIG. VI, the structure of the joining of the catalyst chamber 80 and the burner chamber 30 is clearly shown. The interlocking I-beams and brace supports provide for great strength and give the unit long-lasting durablity. This is hypercritical in keeping the cost of the pollution control device at a reasonable level.

In FIG. VI, a portion of catalyst mounting assembly 120 is shown for the pollution control device 10. Mounting assembly 120 is a system of flanges with mounting aperture flanges 122 having a plurality of assembly apertures 124 therein. The flanges 122 are secured to the frame work 126 of either transition duct work 20, burner chamber 30, or catalyst chamber 80. Mounting flanges 122 include aligning apertures 124 for joining to other sections.

All mounting flanges are similar. Chamber flange 42 is similar to pyramid flange 28 and is similar to catalyst mounting assembly 120. It is then a simple matter to bolt the chambers together—that is bolting of burner chamber 30 to catalyst chamber 80, and burner chamber 30 to transition duct work 20. Nut and bolt assembly (not shown) accomplish the bolting in combination with apertures 124 as shown in FIG. V. Burner band 78 conceals the flanges 122 between catalyst chamber 80 and burner chamber 30.

When considering FIG. VII as a side cross-sectional view in catalyst chamber 80, secured therein is catalyst frame 140. Mounted within catalyst frame 140 is plurality of catalyst elements 142 which contain catalyst ribbons to provide the catalytic aspects of the device. Catalyst frame 140 is secured in catalyst chamber 80 on catalyst flanges 144. The standard nut and bolt arrangement 146 secures the catalyst package in place. With the catalyst frame 140 and the flanges 144 as shown, twelve catalyst elements 142 are secured. Catalyst flanges 144 are secured to the interior of catalyst chamber 80 by welding or other suitable fashion, with catalyst element 142 bolted thereto.

Basically, catalyst element 142 enclose a mass of ribbons of a catalyst substrate coated with a noble metal catalyst which serves to convert the remaining hydrocarbon fumes. The ribbon catalyst and the mounting of this device in the catalytic convertor provide an efficient method of converting the undesired hydrocarbons to a relatively harmless material. Other shapes and forms of catalyst are also suitable for use.

Turning now to FIG. VIII, it can be seen that the catalyst frame 140 is basically a flat structure holding a plurality of catalyst elements 142 containing noble metal coated materials. Catalyst frame 140 is depicted in a bottom view. Protruding from frame 140 are a plurality of cross-members 152 to support the catalyst elements 142 in the catalyst frame 140. As can be seen from FIG. VII catalyst frame 140 has a certain catalyst thickness 154. In this fashion, the catalyst thickness provides for a catalyst surface due to the ribbon nature of the catalyst.

Finally considering FIG. IX, an overall perspective of pollution control 10 is obtained from a block diagram thereof. Pollutants 15 are fed into transition ductwork 24. From transition ductwork 24, pollutants 15 contact baffles 32 and are mixed turbulently with air. The turbulent mixture is burned by heat from burner 200. Gas control apparatus 41 is electrically connected to the pilot regulator 43 and low gas switch 54 to adjust the amount of gas applied to the burner 200. The burned mixture then reaches catalyst elements 142. Thermocouple 82 and high temperature switch 80 avoid dangerous temperature variations of gas reaching the catalyst elements 142 by adjusting the fuel supply to burner 200.

Any material, capable of meeting the high temperatures and harshness of the operating conditions, is suitable for the making of this chamber. Appropriate material having the appropriate strength for the desired results in making the device 10 of this invention is suitable. It is desirable, however, to use stainless steel for the sheet metal, between which the insulation is sandwiched. The frame for the sheet metal may be made of appropriate sized I-beams or similar structural material. Joining of the mechanical parts of this device is accomplished by bolting, riveting or similar sturdy attachments. The electronics are installed in a standard fashion to achieve the desired result. With the stainless steel and the other structures, the device can be sufficiently light weight and of high capability to provide for easy installation and an effective conversion of the undesired poluting material to harmless, non-polluting material.

The combination of burning in an in-line exhaust system with baffles, and the catalyst with the simplified light weight structure of the whole pollution control device permits for an efficient use of a device to convert harmful gases to harmless gases. It is the structure of the baffle plates to create the turbulence near the burner 200 at an efficient temperature for effective burning of the polluting gases. With the catalyst receiving the burned gases, pollution by the gases is further reduced.

Because of this disclosure and solely because of this disclosure, modifications of this method and apparatus can become clear to a person having ordinary skill in this particular art. Such modifications are clearly covered by this disclosure.

What is claimed and sought to be protected by letters Patent by the United States is:

We claim:

1. A pollution control device for converting harmful hydrocarbon emissions to harmless gases, wherein said device includes a transition chamber, transition duct work, a burner chamber, a catalyst chamber, and a cap operably connected to burn and then treat hydrocarbon emissions with a catalyst to reduce a visible amount of said hydrocarbon emissions to an acceptable level and reduce a total amount of said hydrocarbon emissions by more than ninety (90%) percent, wherein:
    a. said transition duct work is connected to an exhaust of a hydrocarbon emitting process;
    b. said transition duct work is connected to said burner chamber, said burner chamber being oppositely disposed from said exhaust and said transition ductwork feeding said hydrocarbon emissions into said burner chamber; said burner chamber being fueled by natural gas, and serving to destroy some of said hydrocarbon vapors by conversion into water and carbon dioxide;
    c. said burner chamber is operably connected to said catalyst chamber; said catalyst chamber being oppositely disposed from said transition ductwork, and said burner chamber serving to preheat a remainder of said hydrocarbons and allow said remainder to flow upwardly in said burner chamber to said catalyst chamber to convert said remainder into said harmless gases;
    d. a burner assembly is secured within said burner chamber;
    e. a baffle assembly is secured within said burner chamber between said burner assembly and said catalyst chamber to provide a turbulent mixture of air and said hydrocarbon emissions to provide for more efficient burning of a portion of said hydrocarbon emissions; and
    f. and said cap is secured to said catalyst chamber and oppositely disposed from said burner chamber to form a top of said device.

2. The device of claim 1 wherein:
    a. said transition duct work includes a chimney support for the purpose of securing said said transition duct work to said exhaust;
    b. said transition duct work includes a pyramidal connector expanding from said chimney support, said pyramidal connector having a smaller portion adjacent said exhaust, and a larger portion of said pyramidal connector adjacent said burner chamber; and c. a chimney flange is secured to said chimney support to permit said device to be secured to said exhaust.

3. The device of claim 2 wherein:

a. said pyramidal connector terminates in a pyramidal flange, said pyramidal flange connects said transition duct work to said burner chamber;

b. a gas control casing is secured to said burner chamber to contain a gas control device, said gas control device serving to direct a flow of gas into a burner secured in said burner chamber; and c. a chamber flange is securee to said burner chamber and matable with said pyramidal flange to secure said burner chamber to said transition ductwork.

4. The device of claim 3 wherein:

a. a mounting assembly connects said burner chamber to said catalyst chamber;

b. a burner band is secured around and covers said mounting assembly;

c. a frame for said device is shaped to form a skeleton for said device;

d. a pair of spaced-apart sheet metal coverings are secured to said frame to protect said device; and e. insulation between said pair of spaced-apart sheet metal coverings are secured to said frame to reduce heat loss.

5. The device of claim 4 wherein:

a. an enclosure is on the outside of said burner chamber;

b. said enclosure contains instrumentation for monitoring ignition and flame of a pilot light for a burner in said burner chamber; and c. a protecting means for wiring, gas lines and air lines for said device.

6. The device of claim 5 wherein:

a. a means to control a temperature of gas reaching a catalyst mounted in said catalyst chamber;

b. said means to control said temperature includes a high temperature switch and a thermocouple;

c. an adjusting means is secured to said device for adjusting said burner to modify temperature of gases reaching said catalyst chamber; and d. a cap is secured to said catalyst chamber and oppositely disposed from said burner chamber to form a top of said device.

7. The device of claim 6 wherein:

a. said device has a door side, a gas line side, a control side, and a plain side; and b. said door side is perpendicular to said gas line side, and plain side; and oppositely disposed from and substantially parallel to said control side.

8. The device of claim 7 wherein a baffle assembly is secured within said burner chamber to provide for a substantial amount of dwell time and turbulence in said burner chamber for said hydrocarbon vapors.

9. The device of claim 8 wherein:

a. a chamber door is mounted on said door side at said burner chamber; and b. said chamber door provides access for a visual inspection of said burner chamber.

10. The device of claim 9 wherein:

a. said chamber door further includes at least one viewing port to check said burner visually;

b. said chamber door is oppositely disposed from said gas control chamber;

c. said chamber door is bolted in a sealed relationship with said burner chamber; and d. said chamber door is insulated.

11. The device of claim 10 wherein:

a. said burner chamber has secured therein a baffle assembly to provide a turbulent mixture of air and pollutant;

b. said baffle assembly is secured to a pair of profile plates;

c. said profile plates direct vapor flow through a burner in said burner chamber; and d. said profile plates are between said burner and a catalyst in said catalyst chamber.

12. The device of claim 11 wherein:

a. said baffle assembly includes baffle flanges, baffle plates, baffle base, baffle wings, and wing brackets;

b. baffle brackets are secured to said frame in said burner chamber;

c. said baffle flanges are secured to said baffle brackets;

d. said baffle plates are secured to said baffle flanges at an obtuse angle;

e. said baffle base is secured to said baffle plates, f. said baffle base has a burner outlet centrally located therein; and g. said baffle assembly include baffle apertures in said baffle flanges, said baffle plates, said baffle base, said baffle wings, and wing brackets to provide turbulence for more efficient burning.

13. The device of claim 12 wherein:

a. said catalyst is secured in said catalyst chamber;

b. a mounting assembly for securing together said device;

c. said mounting assembly includes a system of flanges;

d. said flanges having a plurality of alignable assembly apertures therein for bolting parts of said device together; and e. said flanges are secured to said frame at said transition duct work, said burner chamber, or said catalyst chamber.

14. The device of claim 13 wherein:

a. said baffle wings are adjustable so that static pressure of gas before and after said burner is adjustable;

b. said static pressure is determined by a slack tube manometer, using a water column; and c. said static pressure is desired to be in the range of one to five centimeters.

15. The device of claim 14 wherein said static pressure is two to three centimeters.

16. The device of claim 15 wherein:

a. said catalyst chamber has secured therein a catalyst frame;

b. at least one catalyst element is mounted within said catalyst frame; and c. said catalyst frame encloses ribbons of catalyst substrate coated with a noble metal catalyst which serves to convert the remaining hydrocarbon fumes.

17. A pollution control apparatus for converting harmful hydrocarbon emissions to harmless gases, said apparatus including a transition chamber, transition duct work, a burner chamber, a catalyst chamber, and a cap to burn and then treat hydrocarbons with a catalyst to reduce the amount of the visible hydrocarbon emissions to a very acceptable level and reduce the total amount of hydrocarbon emission by more than ninety (90%) percent; wherein:

a. said transition duct work is connectable to an exhaust of a hydrocarbon emitting process;
b. said duct work feeds the hydrocarbon vapors into said burner chamber; said burner chamber being fueled by natural gas, and serving to destroy some of said hydrocarbon vapors by conversion into water and carbon dioxide;
c. said burner chamber is located upstream of said catalyst chamber and has a burner assembly, which serves to preheat a remainder of said hydrocarbons and allow said remainder to flow upwardly in said burner chamber to said catalyst chamber to convert said remainder into said harmless gases;
d. said transition duct work includes a chimney support for the purpose of securing said apparatus to said exhaust;
e. said transition duct work includes said chimney support to expand into a pyramidal connector having a smaller portion adjacent said exhaust and a larger portion of said pyramidal connector adjacent said burner chamber;
f. a chimney flange is secured to said chimney support to said apparatus to be secured to an exhaust;
g. said pyramidal connector terminates in a pyramidal flange, said pyramidal flange connects said transition duct work to said burner chamber;
h. a gas control casing is secured to said burner chamber to contain a gas control apparatus, said gas control apparatus serving to direct a flow of gas into a burner secured in said burner chamber;
i. a chamber flange secured to said burner chamber and matable with said pyramidal flange to secure said burner chamber to said transition ductwork;
j. a mounting assembly connects said burner chamber to said catalyst chamber;
k. a burner band is secured around and covers said mounting assembly;
l. a frame for said device is secured to form a skeleton for said device;
m. a pair of spaced-apart sheet metal coverings are secured to said frame to protect said device;
n. insulation between said pair of spaced-apart sheet metal coverings is secured to said frame to reduce heat loss;
o. an enclosure is on the outside of said burner chamber;
p. said enclosure contains instrumentation for monitoring ignition and flame of a pilot light for a burner in said burner chamber;
q. a protecting means is provided for wiring, gas lines and air lines of said apparatus;
r. a means to control a temperature of gas reaching a catalyst is mounted in said catalyst chamber;
s. said means to control said temperature includes a high temperature switch and a thermocouple;
t. an adjusting means is provided for adjusting said burner to modify temperature of gases reaching said catalyst chamber;
u. said cap is secured to said catalyst chamber and oppositely disposed from said burner chamber to form a top of said device; and
v. a baffle assembly is secured within said burner chamber between said burner assembly and said catalyst chamber to provide for a substantial amount of dwell time and turbulence in said burner chamber for said hydrocarbon vapors.

18. The device of claim 17 wherein:
a. said baffle assembly is secured to a pair of profile plates;
b. said profile plates direct vapor flow through a burner in said burner chamber;
c. said profile plates are between said burner and a catalyst in said catalyst chamber;
d. said baffle assembly includes baffle flanges, baffle plates, baffle base, baffle wings, and wing brackets;
e. baffle brackets are secured to said frame in said burner chamber;
f. said baffle flanges are secured to said baffle brackets;
g. said baffle plates are secured to said baffle flanges at an obtuse angle;
h. said baffle base is secured to said baffle plates,
i. said baffle base has a burner outlet centrally located therein;
j. said baffle assembly include baffle apertures in said baffle flanges, said baffle plates, said baffle base, said baffle wings, and wing brackets to provide turbulence for more efficient burning;
k. said catalyst is secured in said catalyst chamber;
l. a mounting assembly for securing together said device;
m. said mounting assembly includes a system of flanges;
n. said flanges have a plurality of alignable assembly apertures therein for bolting parts of said device together;
o. said flanges are secured to said frame at said transition duct work, said burner chamber, or said catalyst chamber;
p. an adjusting means is provided for said baffle wings so that static pressure of gas before and after said burner is adjustable;
q. said static pressure is determined by a slack tube manometer, using a water column;
r. said static pressure is adjusted to the range of two to three centimeters;
s. said catalyst chamber has secured therein a catalyst frame;
t. at least one catalyst element is mounted within said catalyst frame; and
u. said catalyst frame encloses ribbons of catalyst substrate coated with a noble metal catalyst which serves to convert the remaining hydrocarbon fumes.

* * * * *